United States Patent [19]

Bernstein

[11] 4,034,801

[45] July 12, 1977

[54] OPTIMUM ENVIRONMENTAL CONTROL SYSTEM FOR A BUILDING

[75] Inventor: William F. Bernstein, Havertown, Pa.

[73] Assignee: Robert J. Sigel, Inc., Narberth, Pa.

[21] Appl. No.: 568,051

[22] Filed: Apr. 14, 1975

[51] Int. Cl.² .................. F25B 29/00; F24F 7/00
[52] U.S. Cl. ................. 165/48; 165/50; 165/53; 165/59
[58] Field of Search .............. 165/48, 50, 53, 2, 59

[56] References Cited
U.S. PATENT DOCUMENTS

| | | | |
|---|---|---|---|
| 3,193,001 | 7/1965 | Meckler | 165/50 |
| 3,420,439 | 1/1969 | Meckler | 165/53 |
| 3,424,233 | 1/1969 | Meckler | 165/48 |

Primary Examiner—Carroll B. Dority, Jr.
Assistant Examiner—Daniel J. O'Connor
Attorney, Agent, or Firm—Paul & Paul

[57] ABSTRACT

A control system for the control of temperature within a building is provided to affect both cooling and heating of the building as required during the winter season with a minimum energy input to the building. Heat transfer is provided between the more interior areas of the building and the more exterior areas of the building so that heat generated in the more interior portions of the building is not entirely wasted by being exhausted directly to the cold outdoors. Chilled water refrigeration equipment, standard forced air systems and outdoor air are utilized to affect the desired heating, cooling and heat transfer within the building.

7 Claims, 3 Drawing Figures

OPTIMUM ENVIRONMENTAL CONTROL SYSTEM FOR A BUILDING

BACKGROUND OF THE INVENTION

1. Field of the Invention

This invention relates to the control of heating and air conditioning systems and particularly to the control of such systems which incorporate the "heat zone" or the "heat balance" concept.

2. Description of the Prior Art

Systems for the maintenance of proper environment temperature control within buildings have long been known with the earliest of such environmental control heating systems being open flame fires. Heating systems for buildings have gradually evolved utilizing a variety of fuel means and utilizing a wide variety of techniques for the transfer of heat from the heat source to the occupied areas of the building. These techniques include forced draft systems, hot air systems, hot water systems, steam systems in enclosed pipes and similar systems. Similarly, air cooling systems for buildings slowly evolved with a number of different systems being well known in the art. These include conventional chilled water systems as well as various types of pressurized systems utilizing different freon refrigerants.

As designs for environmental control systems for buildings have become increasingly more sophisticated, designers have recognized that numerous sources of heat are typically available inside buildings and that these sources of heat can be used to supplement the normal building heating system, thus minimizing the amount of applied fuel required to heat the building. Such additional sources of heat include the sensible heat given off by the people within the building due to their respiration and due to heat transfer between the building internal atmosphere and the individual's human skin, heat emanating from light fixtures, heat produced by various kinds of machinery, and various other heat sources. Designers have found it desirable for efficient heating of a building to utilize all of these sources of heat to the maximum extent possible, so that the designers can minimize the amount of applied fuel required to heat the building. Typical of the devices which have been utilized to take advantage of this general concept are the devices described in the U.S. Pat. No. 3,699,184, issued to Franzreb, and the U.S. Pat. Nos. 3,193,001, 3,420,439 and 3,424,233 issued to Meckler.

As designs progressed, designers found that no heat was required for certain interior portions of some buildings due to the high rate of internal heat generation caused by a high desity of people, by lighting fixtures, or by other factors. In fact, designers found that in many buildings and especially in large office buildings that it was required to affirmatively remove heat from the more interior sections of the building via air conditioning, even during the winter, in order to maintain those interior portions of the building at a comfortable temperature. At the same time it was found that more exterior portions of these buildings generally required heat to be introduced to those sections during the winter months. This is because the building loses heat through its exterior walls and windows to the outside atmosphere.

With these factors in mind, the heat zone or heat balance principle came to be utilized whereby portions of a building which had differing heat requirements during the winter season were categorized as zones and systems were developed to transfer heat from one zone to another. In such systems, the totality of zones in combination with the heating and air conditioning apparatus is referred to as "the system" and heat is discarded from the system only when there is an overall excess of heat in the entire system. In the heat zone concept, if one zone has an excess of heat while another zone has a heat deficit, heat is transferred from the zone with the excess to the zone in which the deficit exits. Generally, only when there is a heat deficit in the system as a whole is an external heat generation source called on to supply heat for those zones of the system which require it.

All buildings are subject to a gain in the amount of heat inside the building due to light, people and equipment inside the building and due to solar energy which is incident on the building. Heat gained through these sources is usually of a sufficient quantity to completely satisfy the heating requirement for the building through a large part of the normal winter heating season, if the building is located somewhere in the earth's temperature zone. Unfortunately, most of the heat which is generated inside the building is generated in areas of the building that have little or no heat transmission loss to the outside or to the other parts of the building which require heat during the winter. Accordingly, most of the heat becomes waste heat energy which is not useable and which must be removed from the interior area of the building in order to maintain the interior of the building at a comfortable temperature. Thus, this heat energy is lost if it is exhausted to the atmosphere. It is apparent that heat recovery is desirable to transfer such potentially wasted heat energy to those areas of a building which require net heat input, due to heat transmission loss through the building walls and due to heat loss due to the ventilation system during the winter season. Additionally, such potentially wasted heat could be used for a plurality of other energy requirements.

Such excess heat energy is conventionally difficult to obtain in a useable form because it exists at a temperature level which is too low for the efficient, direct transfer of heat to areas having a need for net heat input. To render the excess heat energy useful, the temperature of the medium in which this heat energy exists must be raised. This is accomplished in the present invention by application of a standard refrigeration cycle, which requires a small energy input and which provides a portion of the excess heat energy as available heat energy output. Using this approach, the ratio of output heat to input heat can be on the order to 5:1; this is greatly in excess of the best obtainable ratio of 1:1 when heat energy, input to areas having need for net heat input, is directly applied from an external source such as a boiler or other fueled means.

Internal heat is generated at a fairly constant rate in most buildings. Many modern buildings are equipped with a year-round environmental control system which may comprise a conventional heating system and a convention cooling system where these two systems together are operated as needed to maintain the building at a comfortable temperature level. During the summer season, substantially the entire heat load must be removed from the building and rejected to the atmosphere by application of a conventional refrigeration cycle. During the winter season it is customary to use the cooling capacity of cool outdoor air to remove excess heat which is generated in areas of the building having little or no inherent heat loss, such as the more interior areas of the building which do not border on outside walls, and to add heat from some external source to those areas having a net heat loss. Typically those are areas located along the outside walls of the building.

Heat recovery systems designed to capture and transfer excess heat from areas which require heat to be removed and designed to reject heat in areas requiring a net heat input have been known and are old in the art. However, the heat recovery systems which have been known heretofore have not used a balanced system approach where the basic system design goal is predicated on expending the minimum possible amount of energy required to perform the necessary heating function for areas requiring a net heat input, while the total system is simultaneously performing a net cooling function. In a building, so long as the internally generated waste heat equals or exceeds the total building heat loss, a net cooling load exists. This means that the building must be cooled to remove the internally generated waste heat in order to maintain the building at a comfortable temperature. In very cold weather, when building heat losses exceed the internally generated waste heat, heat must be added from an external source in order to prevent the building's internal temperature from dropping below a confortable level. When the building heat loss greatly exceeds the rate of internal heat generation, the excess heat in interior aras of the building can be easily transferred to the more exterior areas of the building. The more difficult problem arises when, during the winter heating, the total building net load is a cooling load. In this situation, the internally generated waste heat within the building exceeds the total building heat loss. Consequently, certain sections of the building must be cooled, due to high rates of internal heat generation, while other sections to the building must be heated, due to low rates of internal heat generation and high losses of heat to the outdoors. This situation is the situation which exists over the greater portion of the normal winter heating season. The balanced system of the present invention is designed to optimize the heating of the building on the basis of minimizing the energy input required to heat the building under these winter conditions.

In accordance with the foregoing, the present invention overcomes the disadvantages inherent in the prior art by providing a balanced system for operation of a standard refrigeration and air conditioning system and associated equipment, to accomplish both summer cooling and winter heating of a building. The present invention is applicable to most standard systems and to most equipment already used in the design of all-year environmental control systems for buildings. The present invention applies standard automatic temperature control components to operate the air conditioning system with a minimum of external heat required for input to the building system. The present invention also utilizes an air conditioning system comprised of standard water chilling equipment and forced air circulating equipment. During winter operation of the present invention, the refrigeration cycle is utilized only as required for heating purposes, for areas of the building which require a net heat input, while outdoor air is used as required to satisfy any net remaining cooling load. The present invention provides a system which will automatically control the operation of the water chiller of the refrigeration system, during winter cycle operation, for the recovery and transfer of waste heat from areas of a building having excess heat due to a high rate of internal heat generation. The present invention further provides a system for automatic control of the air handling apparatus in any zone which acts to provide for the absorption of waste heat and to provide for the transfer of such waste heat to a chilled water cooling circuit, in the proper amount, to satisfy various heating requirements. This control is affected while the net cooling load for the building is simultaneously being satisfied by the introduction of cool outside air.

SUMMARY OF THE INVENTION

It is a primary object of the present invention to provide a system for the transfer of heat, in an environmental control system of the zone type, from one or more zones of heat excess to one or more zones of heat deficit when a minimum of external energy input to the system.

It is a further object of the present invention to provide a system for the transfer of heat in an environmental control system for the zone type, from zones of heat excess to zones of heat deficit, utilizing equipment which operates on a standard chilled water refrigeration cycle.

It is a further object of the present invention to provide a system for the transfer of heat in an environmental control system of the zone type from zones of heat excess to zones of heat deficit where the net output energy is substantially higher than the net input energy.

It is a further object of the present invention to provide a system for the maintenance of winter comfort in a building having a multiple zone heating system by transferring heat from zones of heat excess to zones of heat deficit by using the cooling capacity of cooler outdoor air and by adding heat from an external source of those zones of heat deficit having a net heat loss only after heat from zones of heat excess has been added and which system maintains summer comfort by applying a refrigeration cycle to remove the entire summer cooling load.

It is a further object of the present invention to provide a system which accomplishes the foregoing while using standard refrigeration and air conditioning systems.

It is a further object of the present invention to provide a system which applies standard automatic temperature control components to achieve a balanced system whereby during the winter the refrigeration cycle is utilized only to the capacity required for heating purposes and outdoor air is used, in limited quantities, only to satisfy the net remaining cooling load.

It is a further object of the present invention to provide a system for the practice of a method of automatically controlling the operation of a water chiller component of a standard refrigeration system used in a standard air conditioning system in a building in the winter season, for maintenance of environmental temperatures in the building, to recover and to transfer waste heat.

It is a further object of the present invention to provide a system for the practice of a method of automatically controlling the operation of air handling apparatus, in any zones of a building having a zone heating system, in such a way that the waste heat from any zone in the winter season is absorbed and transferred to a chilled water cooling circuit forming a portion of a standard air conditioning system in an optimum amount to satisfy a heating requirement of an exterior zone, while any net cooling load existent in any zone is satisfied by the introduction of cooler exterior air.

It is a further object of the present invention to provide a system for the practice of the above two methods simultaneously so as to effect the maintenance of a proper temperature in a building having an environmental control system of the zone type whereby a minimum amount of energy is required to be input to the building during the winter season.

SUMMARY OF THE INVENTION

DESCRIPTION OF THE PREFERRED EMBODIMENTS

Figure 1:
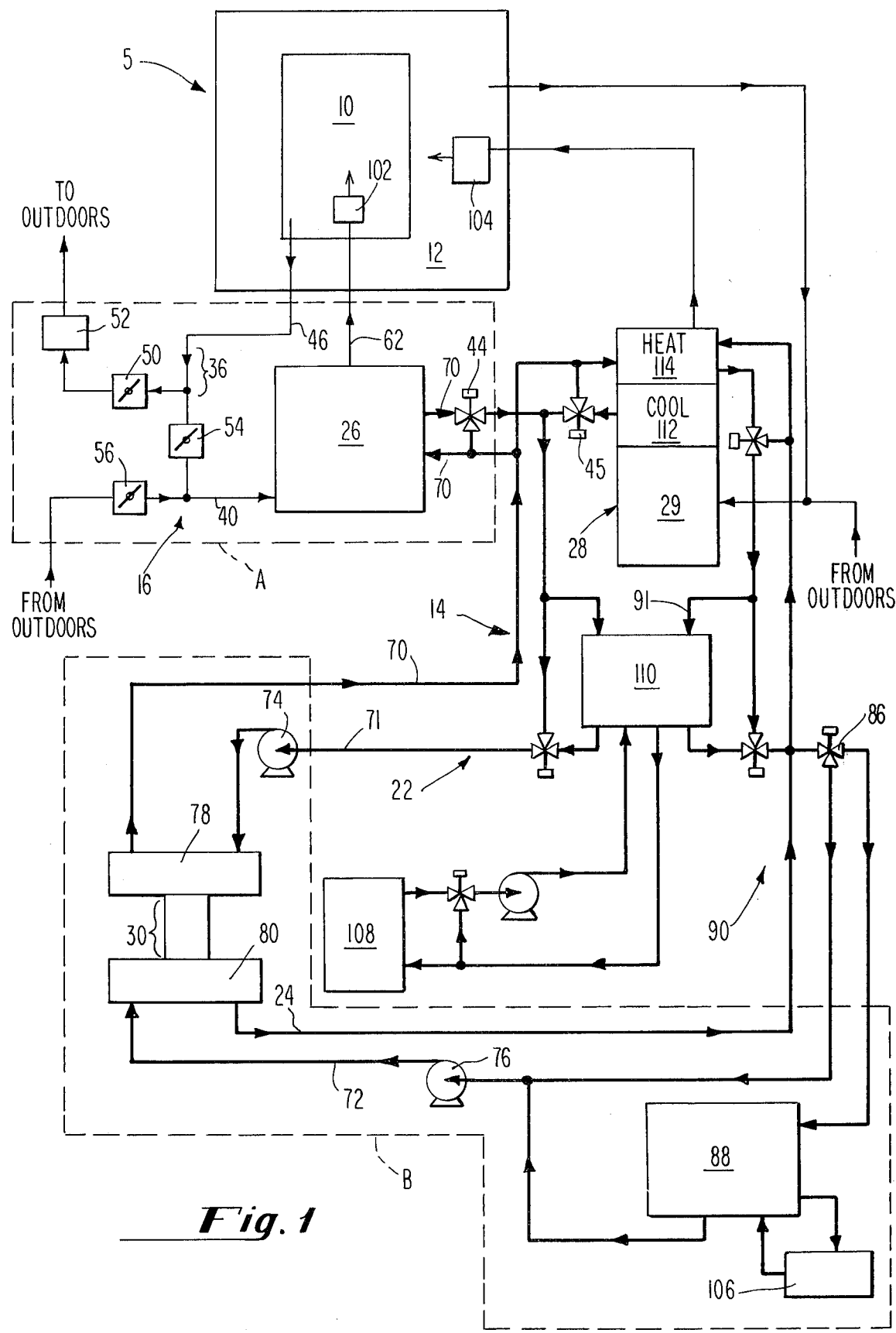
FIG. 1 is a schematic rendition of the preferred embodiment of an apparatus of the present invention for maintaining a controlled temperature in two or more zones of a building during the winter season, while utilizing a minimum amount of external energy for heat to be input to said zones where generally heavy lines denote water lines and generally lighter lines denote air ducts.

Reference is made initially to FIG. 1 where a building, designated generally as 5, has been shown with two temperature control zones, an interior zone 10 and an exterior zone 12. It is to be understood that in the context of the present invention, an "interior zone" designated a zone of a building wherein during the wintertime, it is necessary for heat to be removed from that zone of the building because internally generated heat, such as heat given by machines, lighting fixtures, the respiration of people and the like is not transferred out of the zone of normal convection heat transfer at an adequate rate to maintain the zone at a comfortable temperature. Likewise, the term "exterior zone" in the context of the present invention denotes a zone of a building wherein the rate of internal heat generation is not sufficient to maintain that zone of the building at a comfortable temperature, and accordingly, heat must be added to that zone. It is also to be understood that an exterior zone might well be a zone on the north side of a building, while an interior zone could in fact border an exterior wall of the building but still require heat to be removed therefrom, due to a southerly exposure. Accordingly, it is to be understood that the terms exterior zone and interior zone are terms which relate to the amount of heat which must be taken from or added to a zone, and not necessarily to the geographic location of the zone in the building. In the usual situation, an interior zone will be a zone on the inside of a building, not bordering an exterior wall of the building, and an exterior wall will be a zone bordering one or more exterior walls of the building. However, it is to be understood that this is not always the situation and that the geographic location of zones within a building has no impact on and does not limit the inventive concepts involved herein.

A refrigeration means designated generally as 14 in combination with an air handling means, designated generally as 16, serves to effectively remove heat, as required, from the interior zone 10 and to transfer the heat to the exterior zone 12. It is the operation and control of the refrigeration means designated generally as 14 in combination with the operation and control of the air handling means designated generally as 16 that comprse the central inventive concept of the present invention.

The air handling means 16 is defined generally by the dotted line designated as A in FIG. 1. Still referring to FIG. 1, a heat exchange means 26 for transferring heat from a first interior zone 10 of a building to a first fluid loop heat transfer means designated generally as 22 is shown with a plurality of fluid transport means 70, which are suitably disposed for the transport of a first fluid heat transfer medium therethrough, entering and leaving the heat exchange means 26. An air transport duct means 62 is shown for transporting mixed air from the heat exchange means 26 to the interior zone 10 of the building 5. A return air duct means 46 associated with the interior zone 10 serves to bring air from the interior zone 10 to the air handling means designated generally as 16. The return air duct 46 feeds air into an air transport duct means 36 for transporting return air from the first interior zone of the building to a mixing means. A relief damper means 50 associated with the interior zone 10 is shown as a means for relief ducting return air from the interior zone to the outdoors. A relief fan means 52 serves to remove air from the interior zone 10 and selectably exhaust it to the outdoors, when the relief damper means 50 has been suitably positioned. A return air damper means 54 associated with the interior zone 10 optionally selectably permits mixing of return air from the interior zone with outside air which has been admitted into the duct system by an outside air damper means 56 associated with the interior zone 10. Mixing of outdoor air and air from the interior zone of the building takes place in the mixing duct means 40 which is a means for mixing air transported from outside the building and return air transported from the first zone of the building. An optionally selectably controllable valve means 44 is provided for introducing a first fluid means, which is used as heat transfer means or medium, into the heat exchange means 26. All of the elements shown in the dotted area designated by the letter A are shown in greater detail in FIG. 2.

Continuing with reference to FIG. 1, the refrigeration means designated generally as 14 is shown. Particular reference is made to the area of FIG. 1 enclosed by the dotted line designated as B which denotes that portion of FIG. 1 which is shown in greater detail in FIG. 3. In FIG. 1, a fluid transport means 70 is shown which is suitably disposed for transport of a first fluid heat transfer medium therethrough. A second fluid transport means 72 is also shown which is suitably disposed for the transport of a second fluid heat transfer medium therethrough. The first fluid transport means 70 is suitably disposed to transport a first fluid transfer medium among heat exchange means 78, which is a means for removing heat from the first fluid transfer medium, element 26, the heat exchange means for transferring heat from a first zone of a building to a first fluid loop heat transfer means, and element 28, the heat exchange means for transferring heat between the second fluid loop heat transfer means and the second zone of the building. It will be understood that the first fluid heat transfer medium which circulates through the first fluid transport means 70, travels only between elements 26, 28 and 78 during winter operation of the system. There is no heat transfer between 28 and 78 until a cooling requirement develops in a portion of the exterior zone 12 causing water to flow through the cooling section 112 of heat exchange means 28. A pump means 74 for forcing the first fluid heat transfer medium through the first fluid transport means is provided. Likewise, three-way bypass valves, one of which is typically shown as 44, are provided for bypassing various elements in the first fluid loop heat transfer means 22. A heat storage tank 110 is provided for optional use with the first fluid loop heat transfer means 22.

The second fluid loop heat transfer means, designated generally as 24 in FIG. 1, serves to transfer a second fluid heat transfer medium between a heat exchange means 80, which can add heat to the second fluid heat transfer medium, and the heating section 114 of the heat exchange means 28, which can transfer heat between the second fluid loop heat transfer means and a second zone of the building. A pump means 76 is provided for forcing the second fluid heat transfer medium through the second fluid loop transport means. A cooling tower 88 is provided as is a conventional three-way valve means 86 for causing said second fluid heat transfer medium to optionally selectably bypass the cooling tower 88. A heat exchange means 80 is provided for adding heat to the second fluid means from the first fluid means. A high grade filter unit 106 is provided to filter the second fluid heat transfer means as it passes through the cooling tower 88. An interconnection 91 with the heat storage tank 110 is provided so that the second fluid means may store unusable heat capacity for subsequent use during periods when there is insufficient recoverable waste heat available.

The heat exchange means 28 for transferring heat between the second fluid loop heat transfer means and the second zone of a building has generally a first large chamber designated as 29 and separate cooling and heating chambers designated respectively as 112 and 114. In the particular application illustrated in FIG. 1, the cooling and heating chambers are not used together but rather are used alternately. For instance, the cooling chamber 112 will be utilized when it is required to cool the exterior zone 12 of the building 5. The second fluid loop heat transfer means 22 passes only through the cooling chamber 112 of the heat exchange means 28. The three way valves 45 and 47 are adjusted for cooling and heating operation so that only when cooling of the exterior zone is required does the first fluid heat transfer medium pass through the cooling chamber 112 of the heat exchange means 28 and so that only when heating of the exterior zone is required does the second fluid heat transfer medium circulate through the heating chamber 114 of the heat exchange means 28.

Exterior zone heating and cooling means 28 is intended to recirculate exterior zone return air through the cooling chamber 112 and the heating chamber 114 of the exterior zone heat transfer means 28. A fixed portion of outdoor air may be introduced into the system for ventilation purposes, or ventilation requirements may be provided for the exterior zone by introducing a fixed amount of air from the interior zone cooling means for this purpose.

The duct work is shown symbolically in FIG. 1 as lines connecting the exterior zone 12 and with the heat exchange means 28. This is to aid the clarity of FIG. 1.

A hot water boiler 108 is connected by suitably piping means to heat storage tank 110 to provide a source of heat in the event it is required that heat be added over and above the heat which is obtained from the interior zone 10 by the first fluid loop heat transfer means 22 or the second fluid loop heat transfer means 24.

Figure 2:
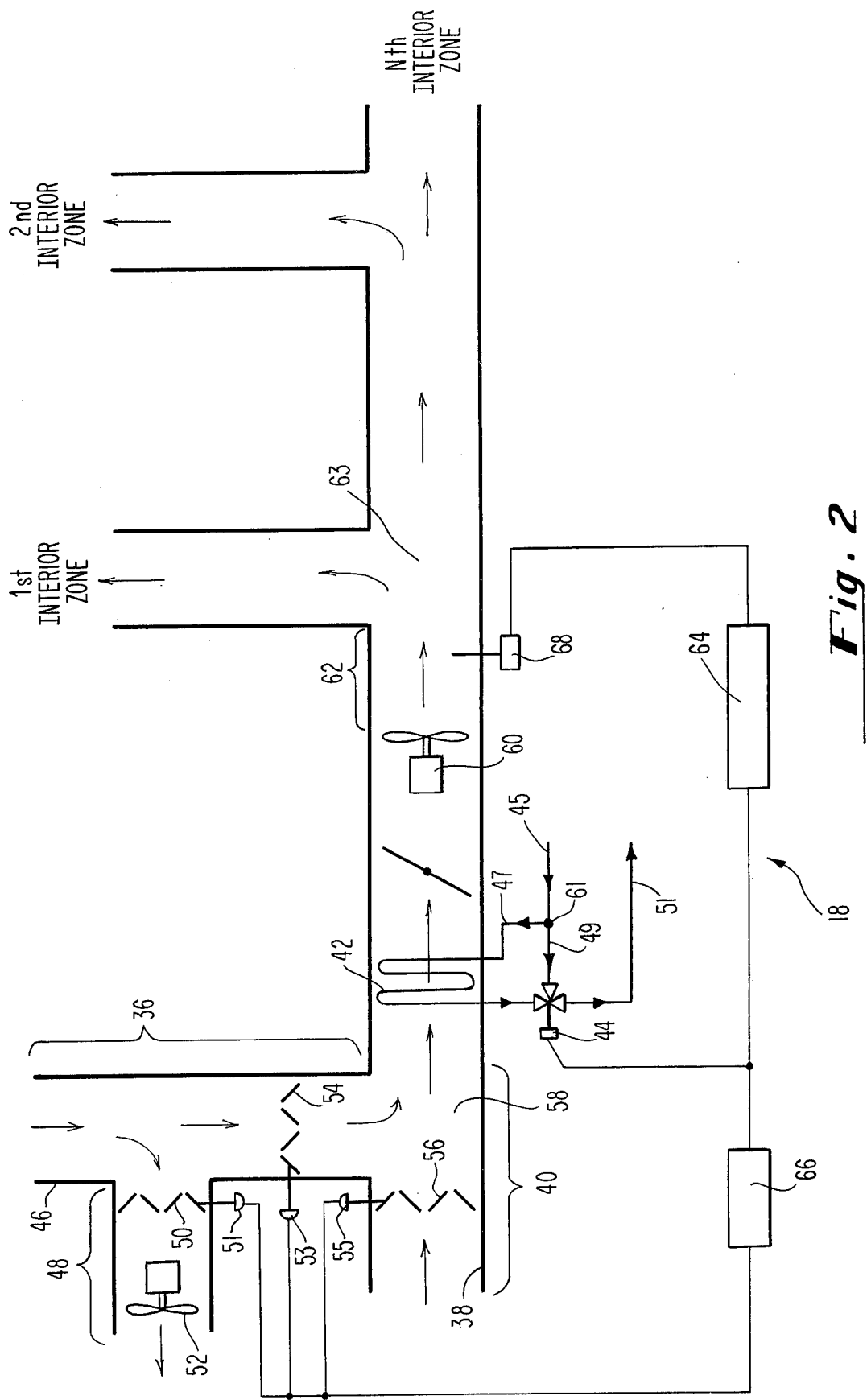
FIG. 2 is an enlarged schematic view of a portion of the apparatus, designated as "A" in FIG. 1 by dotted lines, for maintaining a controlled temperature in two zones of a building during the winter season, showing an air handling apparatus for one or more interior zones in detail.

Reference is made to FIG. 2 which shows the area outlined in FIG. 1 and designated by the letter A in even greater detail. In FIG. 2, there is shown initially an air transport duct means 36 for transporting air from one or more interior zones of a building to a mixing means. A relief air duct means, associated with the interior zone, for optionally selectably exhausting return air to the outdoors, is designated as 48 and has therein a relief fan means 52 and a relief damper means 50. In the context of the present invention, the term "return air" refers to air which has been previously introduced into a zone of the building and which has entered a duct to be recycled, either to the outdoors or back into the building after being mixed with outdoor air and appropriately heated or cooled. The air transport duct means 36 additionally has therein a return air damper means 54, likewise associated with the interior zone, to control the flow of return air into a portion of the duct where the return air is mixed with outdoor air. A mixing duct means 40 for mixing transported air from outside the building with return air is provided. An outside damper means 56 in conjunction with an air transport duct means 38 for transporting air from the exterior of the building to the air mixing means 40 together comprise means for allowing outdoor air to enter the air handling system. Suitable control means 51, 53 and 55 are provided to respectively control the relief damper 50, the return air damper 54, and the outside air damper 56. The three control means 51, 53 and 55 are controlled by a relay means 66 which is responsive to the output of a controller 64. The relay means 66 for controlling the operation of the relief damper, the return air damper, and the outside air damper is connected to the output of the controller means 64 which also is connected to an optionally selectably controllable valve means 44 for introducing a first fluid means, which is used as a heat transfer medium, into a cooling means. The coolant coil means 42 is a cooling means for optionally selectably cooling the mixed air in response to the optionally selectably controllable valve means 44. When the valve means 44 is open, coolant passing through a passageway denoted as 45 will pass through the second leg of a T 61 and into a pipe 47, from where it will pass through the coolant coil 42. After leaving the cooling coil, the coolant will pass again through the three way valve means 44 and through piping 51 to return to the heat exchange means 78 shown in FIG. 1.

A fan means 60 for moving mixed air from the mixing duct associated with the interior zone is provided in the air handling system to force the mixed air across the cooling coil 42 and to deliver the mixed air to one or more interior zones. An air transport duct means 62 for transporting mixed air from the mixing duct to one or more interior zones of a building is provided. A temperature sensor means 68 for sensing the temperature of the mixed air when the mixed air is in an air transport duct downstream from the cooling coil 42 is also provided. The output of the temperature sensor means 68 is connected to the controller means 64 as input to the controller means for actuating the controller means.

Figure 3:
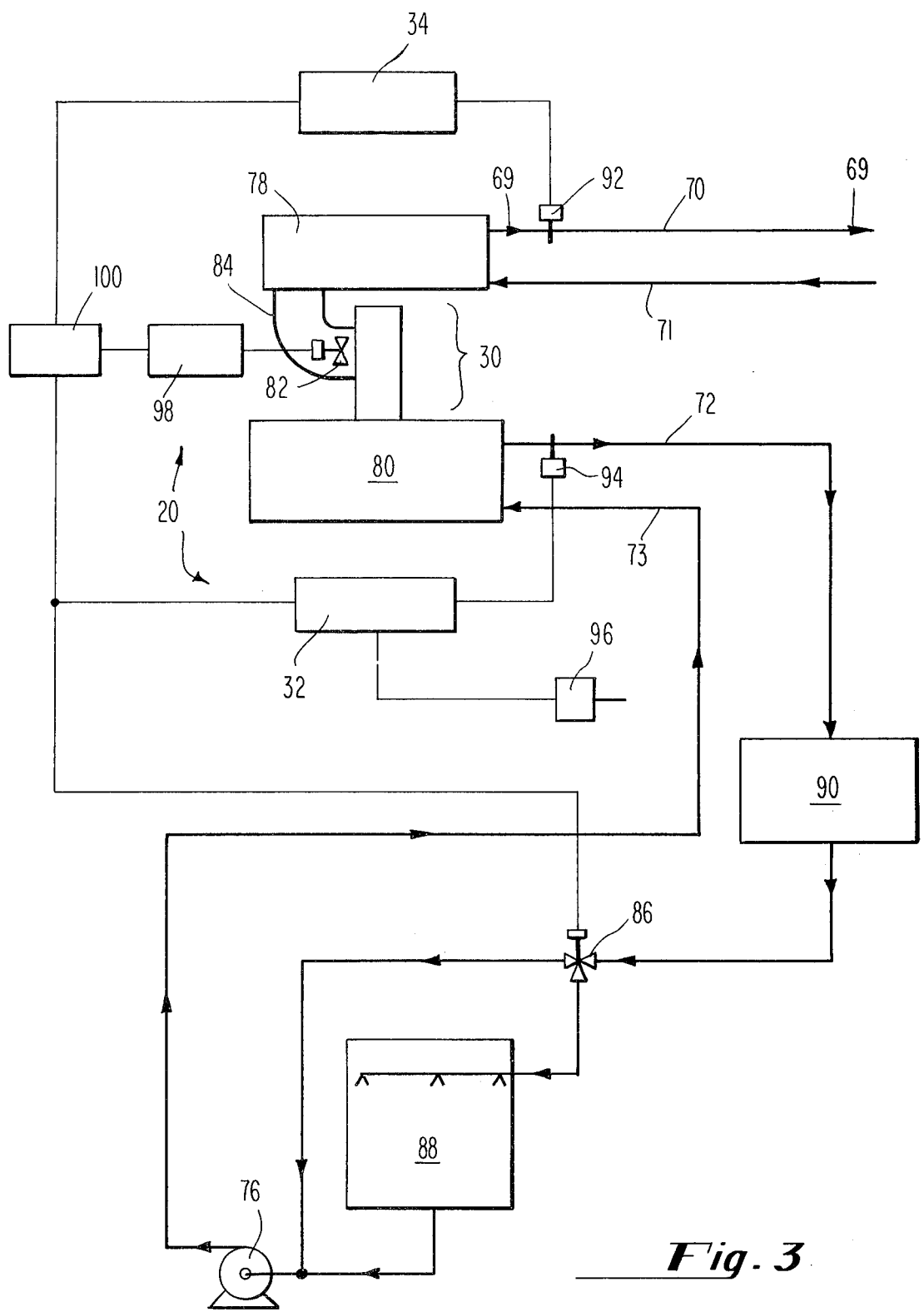
FIG. 3 is a schematic drawing of the control system of the present invention for control of the refrigeration machine of the apparatus for maintaining a controlled temperature in two or more zones of a building during a winter season while utilizing a minimum amount of external energy for heat to be input to said zones.

Reference is now made to FIG. 3 wherein the area shown in the dotted lines designated as B in FIG. 1 is shown in even greater detail. In FIG. 3, it is to be understood that heavy lines denote pipelines designed to carry the two fluid heat transfer media whereas light lines denote electrical or pneumatic condutis designed to carry electrical or pneumatic signals to control the operation of the heat transfer or refrigeration machine designated generally as 30. In FIG. 3, there is shown a first and second fluid transport means designated respectively as 70 and 71, both designed for passage of a first fluid heat transfer medium therethrough where the first fluid transport means 70 carries the first fluid heat transfer medium away from the heat exchange means 78. Heat exchange means 78 is a means for removing heat from the first fluid heat transfer medium. This carrying away of the first fluid heat transfer medium is designated by the arrows 69 on the symbolic line which denotes the first fluid transport means 70. Likewise, the fluid transport means 71 is suitably disposed for the transport of the first fluid heat transfer medium therethrough and serves to carry the first fluid heat transfer medium to the heat exchange means 78. The two heat exchange means 78 and 80 are connected by a thermal connection means comprised of a refrigerant duct 84 which has an adjustable vane assembly 82 therein. When the vane assembly 82 is positioned to permit the passage of refrigerant from heat exchange means 78 to heat exchange means 80, heat transfer from the first fluid heat transfer medium flowing through means 78 to the second fluid heat transfer medium flowing through means 80 is affectuated. By means of a standard mechanical refrigeration cycle the mean temperature of the second fluid transfer medium is increased above the mean temperature of the first fluid heat transfer medium so that it can be transferred to or from a third fluid medium whose mean temperature is between the mean temperatures of the first and second fluid means. In this instance the third fluid medium is the air being cooled or heated by the two heat transfer means 26 and 28. In this condition, means 78 and means 80 are said to be thermally connected. When the vane assembly is positioned such that no passage of air or any other fluid is permitted between means 78 and means 80, means 78 is said to be thermally insulated from means 80. The positioning of the vane assembly 82 is controlled by the two relays 98 and 100 which are in turn controlled by the two controllers 32 and 34 as is fully described herebelow. The two fluid transport means 70 and 71 serve to connect the heat exchange means 78 with the heat exchange means 26 (shown in FIG. 1 but not in FIG. 3) which serves the interior zones of the building for air conditioning during the summer months. Heat exchange means 80 which is a means for adding the heat which has been removed from the first fluid heat transfer medium to the second fluid heat transfer medium is fed with the second fluid heat transfer medium by the second fluid transport means 73 which is suitably disposed for transport of the second fluid heat transfer medium therethrough. Similarly, fluid transport means 72 serves to take the second fluid heat transfer medium away from the heat exchange means 80. A pump means 76 for forcing the second fluid means through the entire second fluid loop transport means (designated generally as 24 in FIG. 1) has been shown. It is to be understood that this means which has been shown only as a block 90 in FIG. 3 consists of the heat exchange means 2, the heat storage tank 110, the valve 86 and the associated piping which is illustrated in FIG. 1. All of this apparatus is well known in the art and accordingly has been omitted from FIG. 3 for the sake of clarity with only the single block 90 serving to designate these elements.

OPERATION OF THE CONTROL SYSTEM

During the wintertime, the automatic temperature controllers 32 and 34 determine operation of the heat exchange means designated generally as 30 in FIG. 3 and the air handling apparatus shown in FIG. 2. Initially a set point temperature is chosen on which controller 32 will operate. This set point temperature will normally be selected by the mechanical systems operator. Controller 32 senses the temperature of the second fluid heat transfer medium leaving the heat exchange means 80 via the temperature sensor 94. Upon determining the temperature of the second heat exchange medium to be below the pre-determined set point temperature, controller 32 will operate to gradually position the valve 86 to bypass the cooling tower 88 so that the second heat exchange medium does not flow through the cooling tower 88. (Normally, during the summer cycle, the second heat transfer medium passes through the cooling tower 88 continuously.) If controller 32 continues to sense a drop in the temperature of the second heat transfer medium below the selected set point temperature, after the three way valve 86 has been placed in the full bypass position causing the second heat transfer medium to entirely bypass the cooling tower 88, the controller 32 will respond through relay 100 and through relay 98 to gradually open the inlet control vanes designated as 82, which are normally closed, to cause heat transfer between the heat transfer means 78 and the heat transfer means 80. The heat which is removed from the first heat transfer medium while it is in the heat exchange means 78 is transferred into the second heat transfer medium while that heat transfer medium is in the heat exchange means 80. This action will serve to reduce the temperature of the first heat transfer fluid medium flowing into and out of heat tranfer element 78, below a theoretical fixed no-load temperature, and also serves to raise the temperature of the second heat transfer medium as it flows out of the heat exchange means 80.

Controller 34 senses the temperature of the first fluid heat transfer medium via temperature sensor 92. Should the temperature of the first heat transfer medium rise above a theoretical fixed no-load temperature which is the same as the aforementioned predetermined set point temperature, the controller 34 will act through relay 100 and relay 98 to override the action of controller 32. This override will result in opening the vanes designated generally as 82 thus permitting the transfer of heat between the first heat transfer medium and the second heat transfer medium via the heat transfer means designated generally as 30, thereby lowering the temperature of the first heat transfer medium in the heat transfer means 78. This override action is necessary to keep the system in balance when changeover of the building from occupied to unoccupied situation, or from unoccupied to an occupied situation occurs.

In order to add stability to the heating system, the controlled temperature of the second heat transfer medium may be varied with the outdoor air temperature. An outdoor air temperature sensor 96 acts to increase the control point setting of controller 32 when the outdoor temperature decreases.

Referring to FIG. 2 during the wintertime, controller 64 controls the air handling apparatus and air dampers to affect the recovery of waste heat from the interior zone or zones as required. Controller 64 has a controller set point set to the same, aforementioned theoretical fixed, no-load temperature. Changeover of the system, from full air cooling as required for the summer, to removal of waste heat from the interior zone as required for the wintertime, normally occurs when the outdoor temperature is equal to or lower than the theoretical fixed no-load temperature to which controller 64 is set.

When the temperature of the supply air, as sensed by the temperature sensor 68, rises above the set point for controller 64, controller 64 acts to gradually open the three-way valve 44 to permit the first fluid heat transfer medium to flow through the cooling coil 42. As the controller 64 through temperature sensor 68 senses a continuing rise in the temperature of air, after valve 44 has opened to permit full flow of the first fluid heat transfer medium through the cooling coil 42, the controller 64 will act through relay 66 to gradually open the outside air damper 56 and the relief damper 50, and to close the return air damper 54. The relay 66 does this by operating the damper controllers 51, 53 and 55.

As the building heat load gradually increases, the temperature of the first fluid heat transfer medium flowing through the cooling coil 42 will gradually drop below the theoretical fixed no-load temperature. This will cause the supply air to be cooled below the set point of controller 64. The controller 64, having sensed this drop in supply air temperature via temperature sensor 68, will respond by acting through the relay 66 to close the outside air damper 56 and to open the return air damper 54 until a sufficient waste heat load has been imposed to balance that load with the simultaneous cooling coil capacity of coil 42 and return the supply air temperature as sensed by temperature sensor 68 to the theoretical no-load fixed temperature of controller 64.

It is to be understood that the controllers 32, 34 and 64 all operate simultaneously and together in response to a change in heating requirement, and that is the operation of these three controllers in concert with one another, producing the operation of the air handling apparatus detailed generally in FIG. 2 in conjunction with the operation of the fluid media heat transfer apparatus detailed generally in FIG. 3 that affects the successful maintenance of the environmental control of the building during the winter with a minimum of external heat being required for input.

It will be understood that the present invention as described herein is applicable to control the heat transfer in buildings in the winter season, utilizing a minimum amount of external energy required as input to the building, where the building has at least one zone which requires a net removal of heat at least a portion of the winter season (heretofore designated as an interior zone), where the building has at least one zone which requires a net addition of heat during at least a portion of the winter season, and where the heat transfer which is controlled is between the interior zone or zones and the exterior zone or zones. Within the context of the present invention, different temperatures for each of the zones, whether interior or exterior, may be obtained, for the comfort of the persons occupying those zones or for any other purpose, by utilizing any of a variety of conventional equipment, while still on balance having a net transfer of otherwise wasted heat from the interior zones of the building to the exterior zones of the building, so that a minimum amount of external energy is required to be input to the building for heating during the winter season.

It will be further understood that this control of temperature in the various interior and exterior zones may be affected by any of a number of different kinds of apparatus, all of which are well known in the art, without changing the inventive concept of the present invention. Specifically, each interior zone may have an individual variable air volume control so as to control the volume of air emitted from the duct 63 into that zone. Such variable air volume control could be used to achieve differing temperatures in each interior zone. Using such variable air volume controls, occupants of each zone would adjust their zone control in order to regulate the amount of cooled air entering their particular interior zone. Such variable air volume controls include automatically controlled mechanisms to increase or decrease the total air supplied in response to a change in individual zone heat gain or loss. Each variable air volume control would have a temperature sensor to control the air damper for that particular zone. The temperature sensor would be adjustable by the individuals occupying the zone for which the temperature sensor operated. Terminal control units combining a temperature sensor, a temperature setting control and an air volume control, suitable for controlling the volume of air introduced into an interior zone from a duct and thereby controlling the temperature of that zone are well known in the art and are commercially available.

A second type of control system which can be utilized in concert with the inventive control system concept of the present invention to maintain chosen temperatures in a different interior zone is a constant air volume control with a low temperature hot water reheat cycle provided to heat, when required, the air which is to be delivered to each zone. Such a constant volume system with a low temperature hot water reheat would involve heat transfer from the second heat transfer fluid medium contained in the piping shown generally as 24 in FIG. 1 or could involve heat transfer from a completely external heat source. Such control systems are well known in the art and are commercially available and further discussion of them is not believed to be warranted herein.

A third method for controlling the temperatures of an individual interior zone is to provide a dual air duct system with mixing between the ducts, so that a hot air duct and a cold air duct are provided, with mixing of the air occurring in a separate terminal supply unit into which air from both the hot air duct and cold air duct is fed. Air mixed in this terminal unit is fed into the space or zone being controlled.

It is to be understood that each of these three methods is applicable to control the temperature of an interior zone. Likewise, the constant volume with a low temperature hot water re-heat system and the dual hot and cold air ducts with mixing therebetween are also applicable to year-round control of exterior zones.

For use in exterior zones only, fan control units, with heating and cooling means and fans to provide any necessary heat, are well known in the art, commercially available, and suitable for use with the method and apparatus of the present invention. It is specifically to be understood that such units are functional only to maintain the temperature control in exterior zones of the building, as opposed to interior zones of the building, while acting in conjunction with the control system of the present invention.

No drawings of any of the variable air volume control, the constant volume with low temperature hot water re-heat control, dual hot and cold air duct control and fan coil control apparatus have been provided in order to aid the clarity of the drawings of the present invention. Applicant believes this will facilitate the understanding of the central inventive concept of the present invention.

In the conventional application of the present invention, it is to be understood that both the first and second fluid heat transfer media will normally be water. Likewise, it will be understood that the portion of the heat transfer apparatus designated generally as A and B in FIG. 1 is a conventional chilled water building air conditioning system of the type in wide use throughout the temperate zones. Such systems use standard, commercially available components and, indeed, that is one of the desirable features of the present invention that it utilizes standard, commercially available components in the context of the present inventive control system. However, it must be emphasized that the control system of the present invention is not limited to applications involving chilled water refrigeration systems, air handling apparatus and standard component systems, but rather is applicable to the broadest range of heat transfer apparatus wherever it is desirable to transfer potentially wasted heat from an area of potential waste to an area where the heat can be used.

Having thus described my invention, I claim the following:

1. Apparatus for maintaining a controlled temperature in a building having first and second zones while utilizing a minimum amount of external energy for heat input to said zones, said first zone being located in the interior of the building and requiring a net removal of heat therefrom for the maintenance of said controlled temperature during the colder weather, said second zone being located within the building but more exterior than said first zone, said second zone requiring a net addition of heat thereto for the maintenance of said controlled temperature, said apparatus comprising:
    a. air-handling means;
    b. refrigeration means;
    c. said air-handling means being adapted to transfer heat from said first zone to said refrigeration means;
    d. said refrigeration means being adapted to transfer heat from said air-handling means to said second zone;
    e. first control means for controlling the temperature in said first zone, said first control means including first means for controlling the mixing of air from outside the building with air from said first zone within the building;
    f. second control means for controlling the temperature in said second zone by controlling said refrigeration means and said air-handling means, thereby to regulate the amount of heat transferred between said first and second zones, said second control means including means for controlling said refrigeration means;
    g. said refrigeration means including a first fluid-loop heat-transfer means having therein a first fluid means as a heat transfer medium and a second fluid-loop heat-transfer means having therein a second fluid means as a heat transfer medium;
    h. said refrigeration means further including:
        h-1. first heat-exchange means for removing heat from said first fluid means in said first fluid-loop heat-transfer means;
        h-2. second heat-exchange means for adding heat to said second fluid means in said second fluid-loop heat-transfer means.
        h-3. thermal connection means for optionally, selectably, thermally connecting said first heat-exchange means thereby optionally, selectably, facilitating the transfer of heat between said first fluid-loop heat-transfer means and said second fluip-loop heat-transfer means;
        h-4. first controller means for controlling said thermal connection means, thereby optionally selectably, permitting thermal connection of said first heat-exchange means and said second heat-exchange means in response to a sensed lower temperature of said second fluid-means heat-transfer medium below a first chosen temperature; and
        h-5. second controller means for controlling said thermal connection means, thereby permitting thermal connection of said first heat-exchange means and said second heat-exchange means, in response to an increase in the temperature of said first fluid means, which is utilized as a heat transfer medium, above a second chosen temperature.

2. The apparatus for maintaining a controlled temperature in two zones of a building during the winter season, utilizing a minimum amount of external energy for heat to be input to said zones, of claim 1, wherein said first means for controlling the mixing of air further comprises:
    a. first air transport means for transporting air from said first zone of a building to a mixing means;
    b. second air transport means for transporting air from the exterior of said building to a mixing means;
    c. mixing means for mixing said transported outside air and said air transported from said first zone of said building;
and wherein said air-handling means for transferring heat from said first zone of said building to said refrigeration means further comprises:
    d. cooling means for optionally, selectably cooling air mixed in said mixing means, in response to an optionally, selectably controllable valve means; and
    e. optionally selectably controllable valve means for introducing said first fluid means which is utilized as a heat transfer medium, into said cooling means.

3. The apparatus for maintaining a controlled temperature in two zones of a building during the winter season, utilizing a minimum amount of external energy for heat to be input to said zones, of claim 2, wherein said first air transport means for transporting air from said first zone of said building to a mixing means further comprises:
 a. return air duct means;
 b. means for optionally selectably exhausting said return air in said return air duct to the exterior of said building;
 c. return air damper means for optionally selectably permitting return air in said return air duct means to pass into a mixing duct means;
wherein said second air transport means for transporting air from the exterior of said building to a mixing means, further comprises:
 d. outside air damper means for optionally selectably controlling the flow of outside air into a mixing duct means; wherein said mixing means for mixing transported outside air from said outside air damper with said air transported from said first zone of said building further comprises:
 e. mixing duct means;
 f. fan means for exhausting mixed air from said mixing duct means to an air transport duct means;
 g. air transport duct means for transporting said mixed air from said mixing duct means to said first zone of said building;
wherein said cooling means for optionally selectably cooling said mixed air is located within said air transport duct means.

4. The apparatus for maintaining a controlled temperature in two zones of a building during the winter season, utilizing a minimum amount of external energy for heat to be input to said zones, of claim 3, wherein said first means for controlling the mixing of air from outside the building with air from said first zone within the building further comprises:
 a. third controller means for actuating said valve means and for controlling the mixing of said air from said first zone of said building and said air from the exterior of said building, said third controller means controlling the mixing of air by optionally, partially or completely opening or partially or completely closing said relief damper means, said return air damper means and said outside damper means, said third controller means acting in response to a sensed temperature of said mixed air in said air transport duct means after said mixed air has passed over said cooling coil.

5. The apparatus for maintaining a controlled temperature in two zones of a building during the winter season, utilizing a minimum amount of external energy for heat to be input to said zones, of claim 4, further comprising:
 a. first relay means for controlling the operation of said relief damper, said return air damper and said outside air damper in response to an output signal produced by said third controller means;
 b. first temperature sensor means for sensing the temperature of said mixed air after said mixed air has passed over said cooling coil, said first temperature sensor means being located in said air transport duct means downstream from said cooling coil;
wherein said valve means is a first three-way valve means, wherein said third controller acts in response to said temperature sensed by said first temperature sensor and wherein said output signal of said third controller means is delivered both to said relay means and to said first three-way valve means, wherein said first three-way valve means is interconnected with said first fluid loop heat transfer means in such a way that upon response of said valve means to said third controller output signal, at least a portion of said first heat transfer fluid medium contained in said first fluid heat transfer means is diverted to pass through said cooling coil means.

6. The apparatus for maintaining a controlled temperature in two zones of a building during the winter season, utilizing a minimum amount of external energy for heat to be input to said two zones, of claim 6, wherein said first fluid loop heat transfer means further comprises:
 a. means for forcing said first fluid means through said first fluid loop heat transfer means;
wherein said thermal connection means further comprises:
 b. compressor means for moving refrigerant initially over said first heat exchange means, elevating temperature of refrigerant by vapor compression, and then moving refrigerant with elevated temperature over said second heat exchange means thereby transferring heat from said first heat transfer means to said second heat transfer means and thus resulting in the transfer of heat from said first fluid means to said second fluid means; and
 c. optionally selectably controllable vane means for optionally selectably preventing or allowing refrigerant moved by said compressor means to pass over said second heat transfer means thereby optionally, selectably preventing or allowing the transfer of heat from said first fluid means to said second fluid means;
and wherein said second fluid loops heat transfer means further comprises:
 d. means for forcing said second fluid means through said second fluid loop heat transfer means;
 e. second three-way valve means;
 f. cooling tower means;
 g. means for transferring heat from said second fluid means to said second zone within the building;
wherein said second three-way valve means is connected to said second fluid transport means in such a way that said valve, when disposed in one position, will permit at least a portion of said second fluid means in said second fluid transport means to pass through said cooling tower means, and, when said valve is in a second position, will cause said second fluid means in said second fluid transport means to bypass said cooling tower means.

7. The apparatus for maintaining a controlled temperature in two zones of a building during the winter season, utilizing a minimum amount of external energy for heat to be input to said two zones, of claim 6, wherein said second means for controlling said refrigeration means further comprises:
 a. a second temperature sensor means for sensing the temperature of said first fluid means for transferring heat as said first fluid means for transferring heat exits from said first heat transfer means through said first fluid transport means;
 b. third temperature sensor means for sensing the temperature of said second fluid transport means for transferring heat as said second fluid means for transferring heat exits from said second heat transfer means through said second fluid transport means;
 c. fourth means for sensing temperature, said fourth means for sensing temperature being means for producing an output signal, the same as would be produced by a temperature sensor which sensed pre-selected simulated outdoor air temperature;

d. second relay means for controlling said optionally selectably controllable vane means in response to signals output by said first controller means and by said second controller means;

e. third relay means suitably disposed for controlling said optionally selectably controllable vane means in response to signals output by said first controller means and by said second controller means;

wherein said first controller means is operatively connected to said third means for sensing temperature, to said means for producing a simulated temperature sensor output signal and to said second relay means, said first controller means being suitably disposed for comparing an output signal from said third temperature sensor means and an output signal from said means for producing a simulated temperature sensor output signal so as to determine when a temperature sensed by said third temperature sensor means is below a first pre-selected temperature to which said means for producing a simulated temperature sensor output has been set;

wherein said first controller means, upon determining that said temperature sensed by said third temperature sensor means is below said first pre-selected temperature to which said means for producing a simulated temperature sensor output signal has been set, is suitably disposed to actuate said second three-way valve means so as to cause said second fluid heat transfer means in said means for transporting said second fluid means to bypass said cooling tower;

wherein said first controller additionally is suitably disposed to determine, after said second three-way valve means has been actuated, thereby causing said second fluid heat transfer means to bypass said cooling tower, that said temperature sensed by said third temperature sensor means has remained below said first pre-selected temperature to which said means for producing a simulated temperature sensor output has been set, after said three-way valve means has been actuated, and, upon such determination, to actuate said second relay means and said third relay means and thereby open said optionally selectably controllable vane means for optionally selectably preventing and allowing refrigerant moved by a compressor means to be passed through a first heat exchange means for removing heat from said first fluid heat transfer means and then to be passed through a second heat exchange means for adding heat to a second fluid heat transfer means, thereby allowing refrigerant moved by a compressor means first to be passed over a first heat exchange means for removing heat from a first fluid heat transfer means and then to be passed over a second heat exchange means for adding heat to a second fluid heat transfer means to said second fluid heat transfer means;

Wherein said second controller means is operatively connected to said second temperature sensor means and to said third relay means, said second controller means being suitably disposed for comparing an output signal from said second temperature sensor means to pre-selected temperature so as to determine when a temperature sensed by said second temperature sensor means is above a second pre-selected temperature;

wherein said second controller means is suitably disposed to override said first controller means and to actuate said third relay means, thereby actuating said second relay means and thereby closing said vane means for optionally selectably preventing and allowing refrigerant moved by a compressor means first to be passed over a first heat exchange means for removing heat from a first fluid heat transfer means and then to be passed over a second heat exchange means for adding heat to a second fluid heat transfer means, thereby preventing the transfer of heat from said first fluid heat transfer means to said second fluid heat transfer means.

* * * * *